Jan. 4, 1944.   H. F. MAYNES   2,338,126
FISHING REEL
Filed Sept. 5, 1941   3 Sheets-Sheet 2
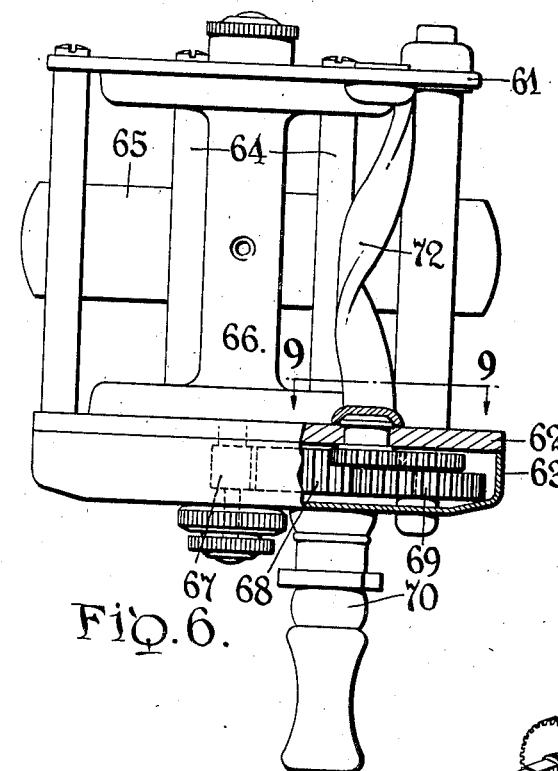
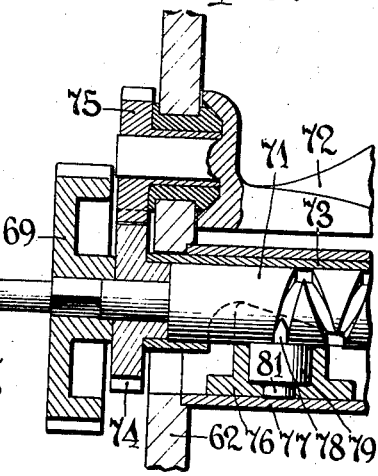
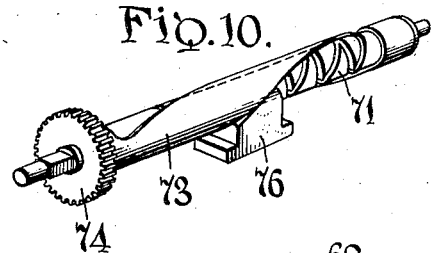
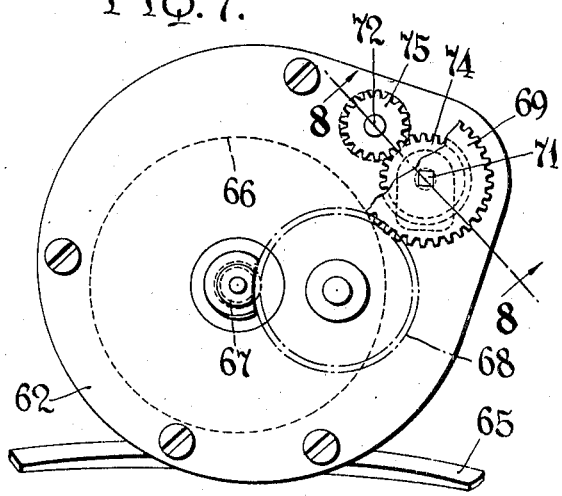
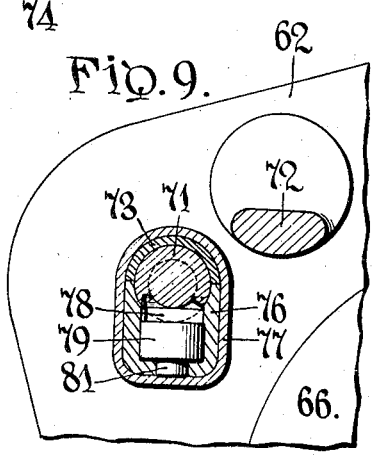
INVENTOR
*HYLA F. MAYNES*
BY
*Bean, Brooks, Buckley & Bean.*
ATTORNEYS

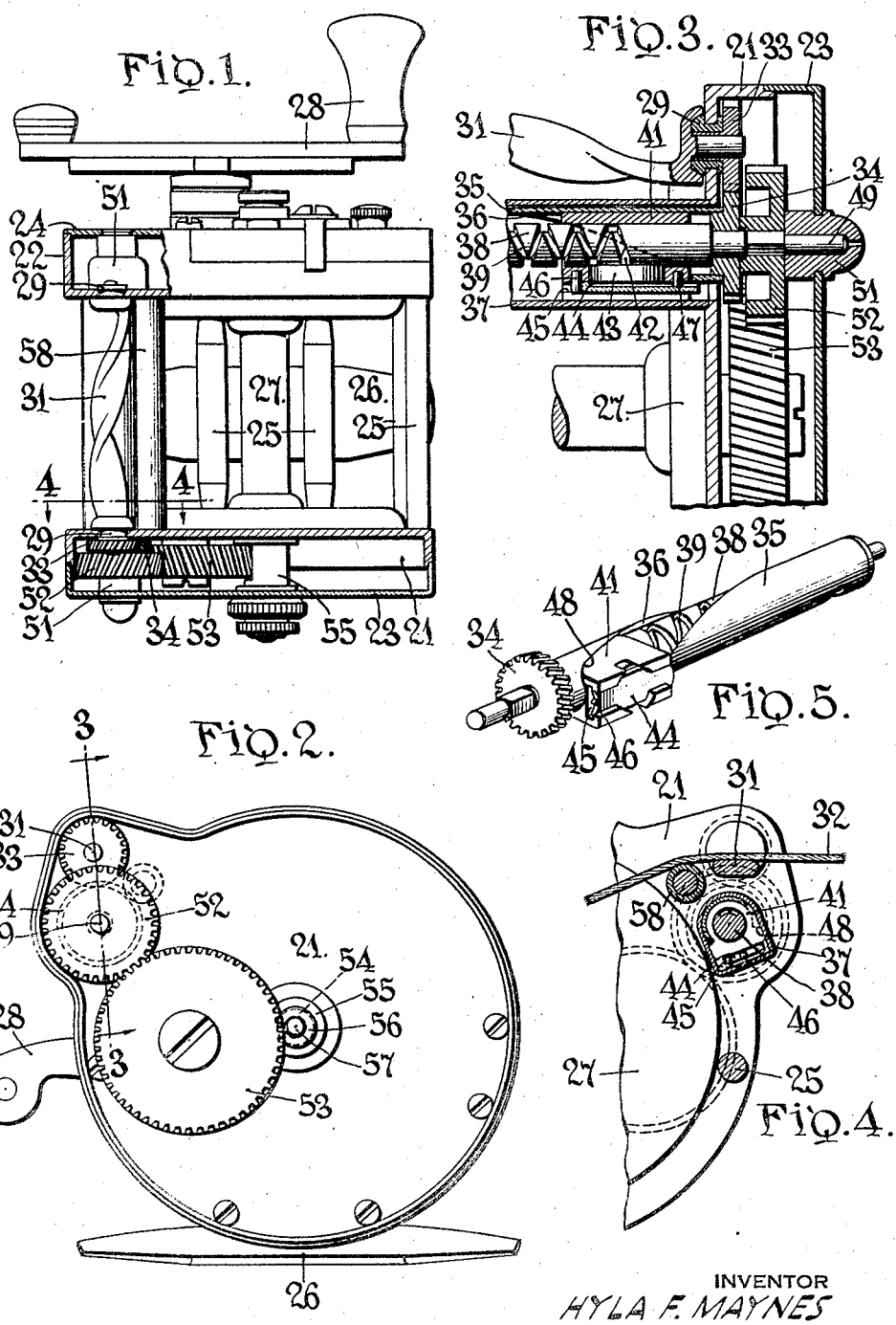

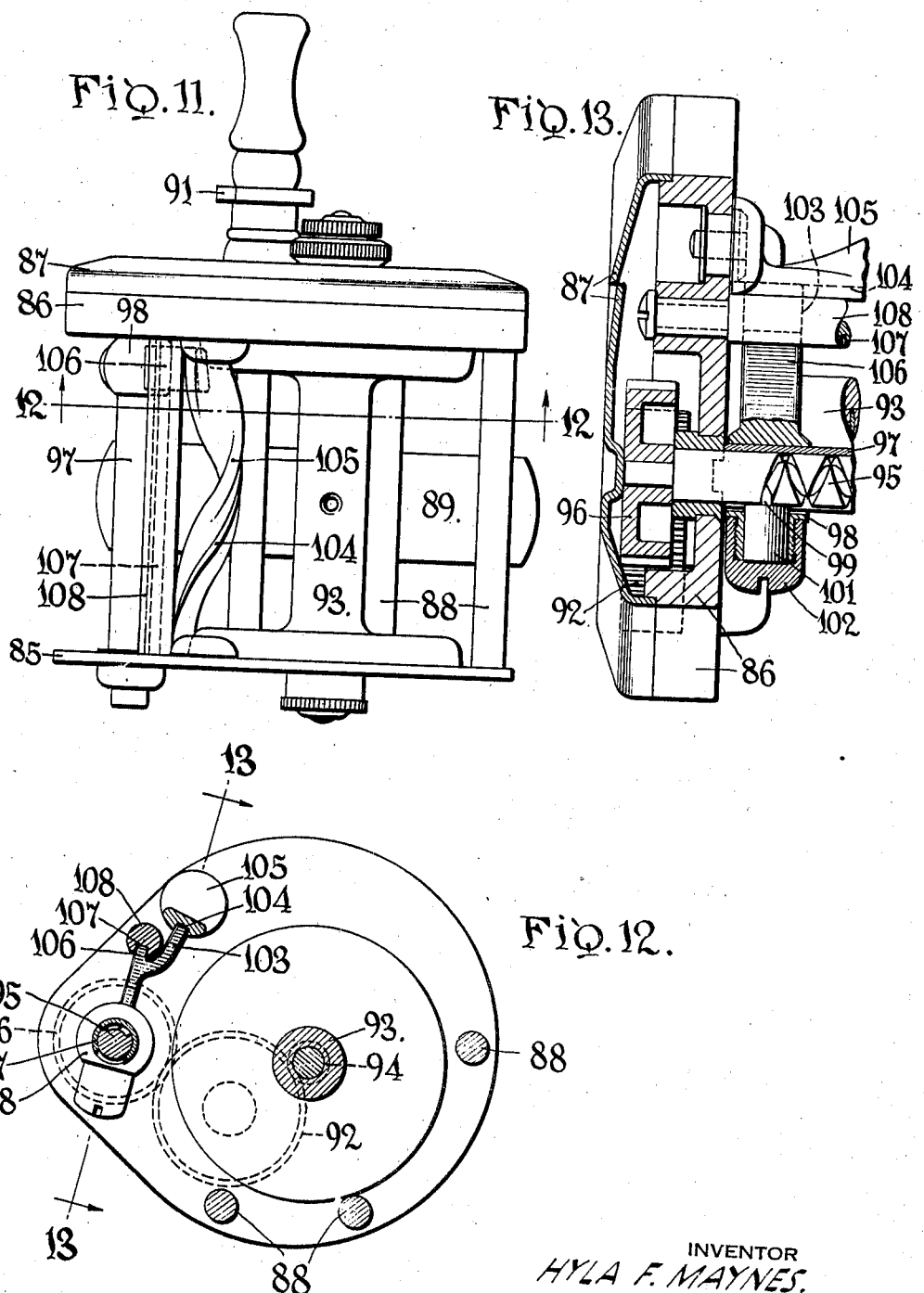

Patented Jan. 4, 1944

2,338,126

UNITED STATES PATENT OFFICE 2,338,126

FISHING REEL

Hyla F. Maynes, North Tonawanda, N. Y., assignor of one-half to Emma C. Maynes, North Tonawanda, N. Y.

Application September 5, 1941, Serial No. 409,701

19 Claims. (Cl. 242—84.4)

The present invention relates to fishing reels and has particular relation to reels having means for feeding fishing line evenly onto the winding spools thereof.

My Patent No. 1,973,636 granted September 11, 1934, relates to a reel having a line feeding means in the form of a level wind shaft which oscillates angularly for shifting the line alternately from end to end of the winding spool. The present invention relates to improvements in means for driving level wind shafts of the general type shown in said patent and similar devices.

According to the present invention a reversely screw threaded element adapted to be rotated with the spool is disposed in parallel relationship to the level wind shaft, and means including a carriage reciprocable by and along the element are provided to translate the rotary motion into angular oscillation, which may be imparted either directly to the level wind shaft by providing the latter with a spiral formation, or may be imparted to another member having such formation and geared to the level wind shaft. The novel arrangements of parts simplify the manufacture and assembly of the reel, and also improve the appearance and operation thereof by reducing the number of drive parts in the end members of the reel.

The invention further contemplates means, which may comprise a guide member or roller between the level wind shaft and the spool, for maintaining a predetermined relationship between the shaft and the line passing thereover, in order to prevent the line from imposing undue strains upon the feeding means, this being of particular importance in reels which are subjected to heavy line loads, such as in surf casting reels.

The invention still further contemplates a novel mechanical movement for translating rotary motion into angular oscillation or alternating rotation in opposite directions. A carriage or traveler engaging and reciprocated axially of a double threaded drive shaft upon rotation of the latter is arranged to engage a spiral formation upon another shaft and to impart to the latter angular oscillation or alternating rotary motions in opposite directions. The driven shaft may comprise a sleeve extending around the drive shaft, thereby providing a very compact motion translating mechanism. The movement may be employed not only in fishing reels but in many other devices or machines wherein it is desired to convert rotation into angular oscillation or alternate reversed rotation.

These and other objects and advantages of the present invention, including those arising from the arrangement and design of the several parts of the structures, will become apparent from the following description of the reels shown in the accompanying drawings, wherein:

Fig. 1 is a plan view, partly in section, of a surf casting type of reel;

Fig. 2 is an end view thereof with an end cover plate removed;

Fig. 3 is a fragmentary sectional view taken along line 3—3 of Fig. 2;

Fig. 4 is a fragmentary section taken along line 4—4 of Fig. 1;

Fig. 5 is a detail perspective view of elements employed in driving the level wind shaft appearing in Figs. 1 to 4, inclusive;

Fig. 6 is a plan view, partly in section, of another type of reel, adapted for bait casting and the like;

Fig. 7 is an end view of the reel of Fig. 6 with the cover plate, carrying the winding handle, removed therefrom;

Fig. 8 is a fragmentary sectional view taken along line 8—8 of Fig. 7;

Fig. 9 is an enlarged section taken along line 9—9 of Fig. 6;

Fig. 10 is a perspective view of drive elements for the level wind shaft shown in Figs. 6 to 9, inclusive;

Fig. 11 is a plan view, similar to Fig. 6, of a modified reel structure;

Fig. 12 is a sectional view taken along line 12—12 of Fig. 11; and,

Fig. 13 is a sectional view taken in offset planes along line 13—13 of Fig. 12.

The reel shown in Figs. 1 to 5, inclusive, has a frame comprising end members 21 and 22 provided, respectively, with covers 23 and 24 and connected by pillars 25, the lower of which may be joined to a saddle 26. The flanged line winding spool, designated 27, is journaled in the frame and is adapted to be rotated by turning of handle 28 to which it is connected by suitable gearing in the chamber between cover 24 and end member 22.

Disposed between and journaled in bearings 29 mounted on the end members is a level wind shaft 31, the shaft having a generally spiral formation so that upon angular oscillation thereof it will present to the line, 32, a trough moving from side to side of the spool in which the line will ride to feed evenly onto the spool. The level wind shaft is driven in synchronism with rotation of the spool, and to this end is provided with a pinion 33 meshing with a gear 34 in the chamber between end member 21 and cover 23.

Gear 34 is secured to a sleeve 35 which has a spiral formation extending therealong which, in the illustrated embodiment, takes the form of a spiral slot 36. The sleeve is disposed within a tubular member 37 of substantially D shape in cross section that extends between the frame end members, having its ends set in recesses in the end members; and telescoped and coaxially disposed within the sleeve is a drive shaft 38 having a reversely threaded formation thereon, the formation consisting of a groove 39 in the illustrated embodiment.

Slidable on shaft 38 and partially within sleeve 35 is a carriage 41 having a pawl 42 engaging in the reversely threaded groove 39. The pawl has a relatively large cylindrical head 43, of diameter approximately equal to the width of the carriage, retained in a recess in the latter by a plate 44 slidable in an undercut groove 45 extending longitudinally of the carriage. As shown in Figs. 3 and 4, a pin 46 prevents escapement of the plate from the carriage in one direction, while a pin 47 whose end is slidable in a groove in the plate, restricts movement of the plate in the opposite direction. The plate, upon removal of the sleeve and shaft assembly from the tube 37, may be slid in such opposite direction sufficiently to uncover the recess and allow the pawl to be removed.

The carriage is guided in its movement upon shaft 38 by the tube 37 which, by holding the carriage against rotation about the shaft axis, compels it to reciprocate upon the shaft as the latter rotates. Shoulders 48 on the carriage engage the walls of the slot in sleeve 35, as shown in Figs. 4 and 5, and thereby cause the sleeve to oscillate angularly about its longitudinal axis as the carriage reciprocates, the angular oscillation of the sleeve being imparted to the level wind shaft through gears 33, 34.

The shaft 38 has journal portions 49 in bearings 51 which may be carried by the cover plates 23 and 24, and also has a pinion 52 meshing with a gear 53 which in turn meshes with a drive pinion 54 on the spindle of spool 27, the latter pinion being disposed, in the illustrated embodiment, within a bearing support 55 extended from end member 21. This support 55 may have bearing portion 56 for the spool spindle 57 as shown in Fig. 2.

It will be understood that as the spool 27 rotates, the gearing described will cause the level wind shaft to oscillate angularly, for shifting line 32 alternately from end to end of the spool. As line is wound in layers and builds up on the spool, the angularity of the section of line between the level wind shaft and the spool will change, and, assuming the line to be under tension, this will result in the line at times imposing on the level wind shaft pressure, tending to rotate the latter counter to the direction in which it is being driven by the gearing, or faster in the same direction. To obviate this difficulty a guide member, which may assume the form of roller 58, is provided, being disposed between the level wind shaft and the spool, and slightly above the level of the spool when the latter is wound to a normal full condition. The guide member 58, as will appear from Fig. 4, will preserve the angular relation between the line 32 and level wind shaft, regardless of variation in the amount of line wound on the spool.

In the form of the invention shown in Figs. 6 to 9, the gearing for driving the level wind shaft and the gearing between the winding handle and spool, are disposed on the same end of the reel. The frame comprises end plates 61 and 62, the latter provided with a cover 63, and the plates being connected by pillars 64, to the lower two of which a saddle 65 is connected. The spindle of a flanged winding spool 66 is provided with a pinion 67 meshing with gear 68 which is mounted on the shaft of the winding handle 70, the latter being carried by the cover member 63. Gear 68 also meshes with pinion 69 secured on the reversely threaded drive shaft 71 for level wind shaft 72. Surrounding shaft 71 is a spirally slotted sleeve 73 upon which is mounted a gear 74 for meshing engagement with a pinion 75 on the level wind shaft.

The sleeve 73 and shaft 71 may have bearing relation since the slot in the sleeve is substantially 180° in width, and the carriage, 76, does not extend fully around the double threaded shaft as does carriage 41 in the first described embodiment, but extends only half way therearound. The carriage is held in sliding engagement with the shaft 71 and sleeve 73 by the tubular guide member 77 whose ends fit into recesses in the end plates as shown in Fig. 8. A pawl 78 has a cylindrical head 79 seated in a like recess in the carriage and a projection 81 protruding into an opening in the bottom wall of the carriage, so that upon removal of the latter the pawl may be pushed from the carriage with any small implement.

As will be apparent from the description, the mode of operation of the device is substantially the same as that of the reel shown in Figs. 1 to 5; when spool 66 rotates, gearing 67, 68, 69 effects rotation of reversely threaded shaft 71, this causing carriage 76 to reciprocate along shaft 71 within guide tube 77. Such reciprocation of the carriage in turn causes sleeve 73 to oscillate angularly, and acts through gearing 74, 75 to similarly oscillate the level wind shaft to shift a line being wound onto the spool alternately from end to end of the latter.

In the form of the invention shown in Figs. 11 to 13, inclusive, the level wind shaft is driven directly from the carriage on the reversely threaded shaft, the carriage engaging a spiral formation on the level wind shaft. The general reel structure may be similar to that just previously described, comprising a frame with end members 85 and 86, cover plate 87, connecting pillars 88, saddle 89, winding handle 91 and drive gear 92, spool 93 having drive pinion 94 engaging gear 92, and reversely threaded shaft 95 having pinion 96 also meshing with gear 92.

Extending around the reversely threaded shaft 95 is a protective sleeve 97 on which is slidable a carriage 98. The latter has a recess receiving head 101 of a pawl 99 that engages the reversely threaded formation on the shaft 95, the pawl extending through a slot in the sleeve 97 and being retained in the recess in the carriage by a screw cap 102. An extension 103 from the carriage engages in a spiral slot 104 in level wind shaft 105. To further guide the carriage a branch 106 of the carriage extension may engage in a straight slot 107 in the adjacent connecting pillar, designated 108.

In operation, rotation of the handle 91 will be imparted to the spool and to the reversely threaded shaft 95 through gearing 92, 94, 96, and rotation of the shaft 95 will effect oscillation of the carriage on its guides 97 and 108. Such oscillation of the carriage from end to end of the spool and level wind shaft will serve to oscillate the latter angularly about its axis by engagement of extension 103 in sliding engagement in spiral slot formation 104.

It will be understood that the embodiments shown and described herein are merely illustrative of the inventive principles involved, and that these may be otherwise embodied without departing from the spirit of the invention or the scope of the appended claims.

What is claimed is:

1. In a fishing reel, a frame and a spool mounted thereon for winding a fishing line, a level wind shaft mounted on the frame for shifting the line alternately from end to end of the spool, a reversely threaded drive shaft rotatable with said spool and a carriage engaging the reversely threaded drive shaft and adapted to be reciprocated thereby, a member having a spiral formation engaged by the carriage and oscillated angularly by the carriage as the latter reciprocates, and means for transmitting such angular oscillation of said member to the level wind shaft.

2. In a fishing reel, a member having a spiral recess therein, a reversely threaded shaft and a carriage engaging said shaft and adapted to be reciprocated thereby upon rotation of the shaft, the carriage having a portion slidably engaging in said spiral recess for angularly oscillating said member.

3. In a fishing reel, a frame comprising spaced ends and a spool mounted therebetween for winding a fishing line, a level wind shaft mounted on the frame for shifting the line alternately from end to end of the spool, a reversely threaded shaft journaled at its opposite ends in said spaced frame ends and extending substantially parallel to said spool and said level wind shaft, means connecting the threaded shaft and the spool for rotation, and means including a carriage movable axially on the threaded shaft and reciprocated thereby upon rotation of the threaded shaft for angularly oscillating said level wind shaft.

4. In a fishing reel, a spool for fishing line and a level wind shaft having its axis substantially parallel to the axis of the spool, a reversely threaded shaft having its axis parallel to the axis of the spool and connected for rotation therewith, a carriage mounted for movement axially of said shafts and engaging the reversely threaded shaft for reciprocation thereby, and a driving connection between the carriage and level wind shaft for effecting angular oscillation of the latter upon reciprocation of the carriage, said driving connection including a shaft extending parallel to said level wind shaft and geared thereto and having a peripheral cam formation for engagement by said carriage whereby reciprocation of the latter oscillates said last-mentioned shaft.

5. In a fishing reel, a frame having a pair of end members, a spool for fishing line mounted on the frame and disposed between said end members, a level wind shaft mounted on the frame and disposed between said end members for shifting line alternately from end to end of the spool, a tubular member connecting the end members and having its axis substantially parallel to the axes of the spool and level wind shaft, a reversely threaded member and a member having a spiral formation mounted coaxially within said tubular member, and a carriage engaging said members, being reciprocated therealong by the reversely threaded member upon rotation of the latter and in so reciprocating functioning to oscillate angularly the spirally formed member, the tubular member guiding the carriage during such reciprocation, a driving connection between the spool and the reversely threaded member in one of said end members and a driving connection between the spirally formed member and the level wind shaft in one of said end members.

6. In a fishing reel, a spool for fishing line and a level wind shaft for shifting line alternately from end to end of the spool, a reversely threaded member and a member having a spiral formation coaxially disposed in substantial parallelism to said level wind shaft, a carriage engaging said members, being adapted for reciprocating along the reversely threaded member upon rotation of the latter and in so reciprocating functioning to oscillate angularly the spirally formed member, a gear drive between the spool and the reversely threaded member, and a gear drive between the spirally formed member and the level wind shaft.

7. In a fishing reel, a level wind shaft and a spirally slotted sleeve geared thereto, a reversely threaded drive shaft disposed within said sleeve, a carriage having a pawl engaging the threads of the drive shaft and having a portion engaging in the slot of the sleeve, and a substantially tubular housing for the sleeve and shaft and carriage, said housing retaining the carriage in engaged relation to the shaft and sleeve, and guiding the carriage in reciprocating movement axially along the shaft as the latter rotates.

8. In a drive for the level wind shaft of a fishing reel, a reversely threaded drive shaft, a spirally slotted sleeve extending therearound, a pawl carriage having a pawl engaging the threads of the shaft, the carriage engaging the slotted portion of the sleeve for angularly oscillating the latter as the carriage reciprocates axially of the shaft, and means for guiding the carriage during such reciprocation.

9. In a fishing reel, a level wind shaft and a spirally slotted sleeve geared thereto, a reversely threaded drive shaft disposed within said sleeve, a carriage mounted for reciprocation upon the shaft and having a pawl engaging the threads thereof, said carriage having a portion extending through the slot of the sleeve, and a substantially tubular member housing said sleeve and said extending portion of the carriage and for guiding the latter in its reciprocatory motion upon the shaft.

10. In a fishing reel, a reversely threaded drive shaft and a driven shaft substantially parallel thereto having a spiral formation thereon, a carriage mounted for reciprocation axially of said shafts, said carriage having a pawl engaging the threads of the drive shaft and a portion engaging the spiral formation on the driven shaft, whereby rotation of the drive shaft will reciprocate said carriage to effect angular oscillation of the driven shaft.

11. In a fishing reel, a reversely threaded drive shaft and a level wind shaft substantially parallel thereto, said level wind shaft having a spiral groove therein, a carriage and a member for guiding the carriage in movement axially of said shafts, the carriage having a portion engaging the threads of the drive shaft and a portion engaging in the groove of the level wind shaft, for oscillating the latter angularly upon rotation of the drive shaft.

12. In a fishing reel, a frame having a pair of end members and a tubular member extending therebetween, a cover plate on one of said end members providing a chamber in the end member communicating with the interior of said tubular member, a level wind shaft extending between said end members and having a pinion disposed in said chamber, a pair of coaxial rotatable elements extending within said tubular member, one of said elements having a reversely threaded formation thereon, and the other thereof having a spiral formation thereon and having a gear in said chamber for driving said pinion, a carriage reciprocable axially along said elements and engaging said formations to translate rotation of the element having the reversely threaded formation into angular oscillation of the element having the spiral formation, and said elements and carriage being removable from said tubular member upon removal of said cover plate.

13. In a drive mechanism, a reversely threaded drive shaft, a spirally slotted sleeve extending therearound, a pawl carriage having a pawl engaging the threads of the shaft, the carriage engaging the slotted portion of the sleeve for angularly oscillating the latter as the carriage reciprocates axially of the shaft, and means for guiding the carriage during such reciprocation.

14. In a drive mechanism, a reversely threaded drive shaft and a driven shaft having a spiral formation thereon, and a traveler mounted for movement substantially axially of said shafts, said traveler being provided with portions engaging the threads of the drive shaft and the spiral formation on the driven shaft, to impart alternate reversed rotary movements to the latter upon rotation of the drive shaft.

15. In a drive mechanism, a reversely threaded drive shaft and a driven shaft substantially parallel thereto having a spiral formation thereon, a carriage mounted for reciprocation axially of said shafts, said carriage having a pawl portion engaging the threads of the drive shaft and a portion engaging the spiral formation on the driven shaft, whereby rotation of the drive shaft will cause reciprocation of said carriage to effect angular oscillation of the driven shaft.

16. In a drive mechanism, a reversely threaded drive shaft, a spirally slotted sleeve extending therearound, a pawl carriage having a pawl portion engaging the threads of the shaft, the carriage engaging the slotted portion of the sleeve for angularly oscillating the latter as the carriage reciprocates axially of the shaft upon rotation of the latter, and a casing extending around said sleeve and guiding the carriage for reciprocatory motion.

17. In a drive mechanism, a reversely threaded drive shaft, a carriage having a portion engaging the threads of the shaft, a member extending around the shaft and engaging the carriage for guiding it in reciprocatory motions substantially axially of the shaft as the latter rotates, and a member having a spiral formation engaged by said carriage and alternately rotated in opposite directions by and upon reciprocation of the carriage.

18. In a fishing reel, a frame having a pair of end members and a tubular member extending therebetween, a cover plate on one of said end members providing a chamber in the end member communicating with the interior of said tubular member, a level wind shaft extending between said end members and having a pinion disposed in said chamber, a pair of coaxial rotatable elements extending within said tubular member, one of said elements having a reversely threaded formation thereon, and the other thereof having a spiral formation thereon and having a gear in said chamber for driving said pinion, a carriage reciprocable axially along said elements, said carriage having a part engaging said spiral formation, a pawl engaging said reversely threaded formation, the carriage having a recess receiving said pawl and a plate having limited sliding movement in said carriage to uncover said recess to allow removal of the pawl upon removal of the carriage from said tubular member, and said elements and carriage being removable from said tubular member upon removal of said cover plate.

19. In a fishing reel, a frame comprising a pair of end members and a winding spool mounted therebetween, a level wind shaft journaled in said end members and having its axis disposed in substantially parallel relation to the axis of the spool, a reversely threaded screw, means reciprocated by the screw upon rotation thereof, and rotatably mounted means having a peripheral cam formation for engagement with the reciprocated means whereby the rotatable means is oscillated by reciprocation of said reciprocated means, said rotatably mounted means having driving connection with the level wind shaft for transmitting its oscillation thereto, and means for rotating the screw upon rotation of the spool.

HYLA F. MAYNES.